United States Patent [19]

Radke

[11] Patent Number: 4,884,824

[45] Date of Patent: Dec. 5, 1989

[54] MAGNETIC FENDER COVER

[76] Inventor: Percy B. Radke, 1701-1th St. SW., Minot, N. Dak. 58701

[21] Appl. No.: 216,656

[22] Filed: Jul. 7, 1988

[51] Int. Cl.$^4$ .................. B60R 27/00; B65D 65/02
[52] U.S. Cl. ............................ 280/770; 293/128; 150/166
[58] Field of Search .............. 280/770; 293/128; 296/95.1, 77.1, 83; 49/57; 150/52 X, 166

[56] References Cited

U.S. PATENT DOCUMENTS

| | | | |
|---|---|---|---|
| 3,298,712 | 1/1967 | Greenstadt | 150/52 K |
| 4,041,999 | 8/1977 | Miller | 150/52 K |
| 4,531,560 | 7/1985 | Balanky | 150/52 K |
| 4,726,406 | 2/1988 | Weatherspoon | 150/52 K |
| 4,734,312 | 3/1988 | Sugiyama | 150/52 K |

FOREIGN PATENT DOCUMENTS 928869 6/1963 United Kingdom ............ 150/52 K

*Primary Examiner*—Charles A. Marmor
*Assistant Examiner*—Tamara L. Finlay
*Attorney, Agent, or Firm*—Fleit, Jacobson, Cohn, Price, Holman & Stern

[57] ABSTRACT

A fender cover is provided including an upper marginal portion specifically designed to afford frictional, mechanical, and magnetic connections with the upper marginal edge and depending mounting flange portion of an underlying associated vehicle fender.

9 Claims, 1 Drawing Sheet

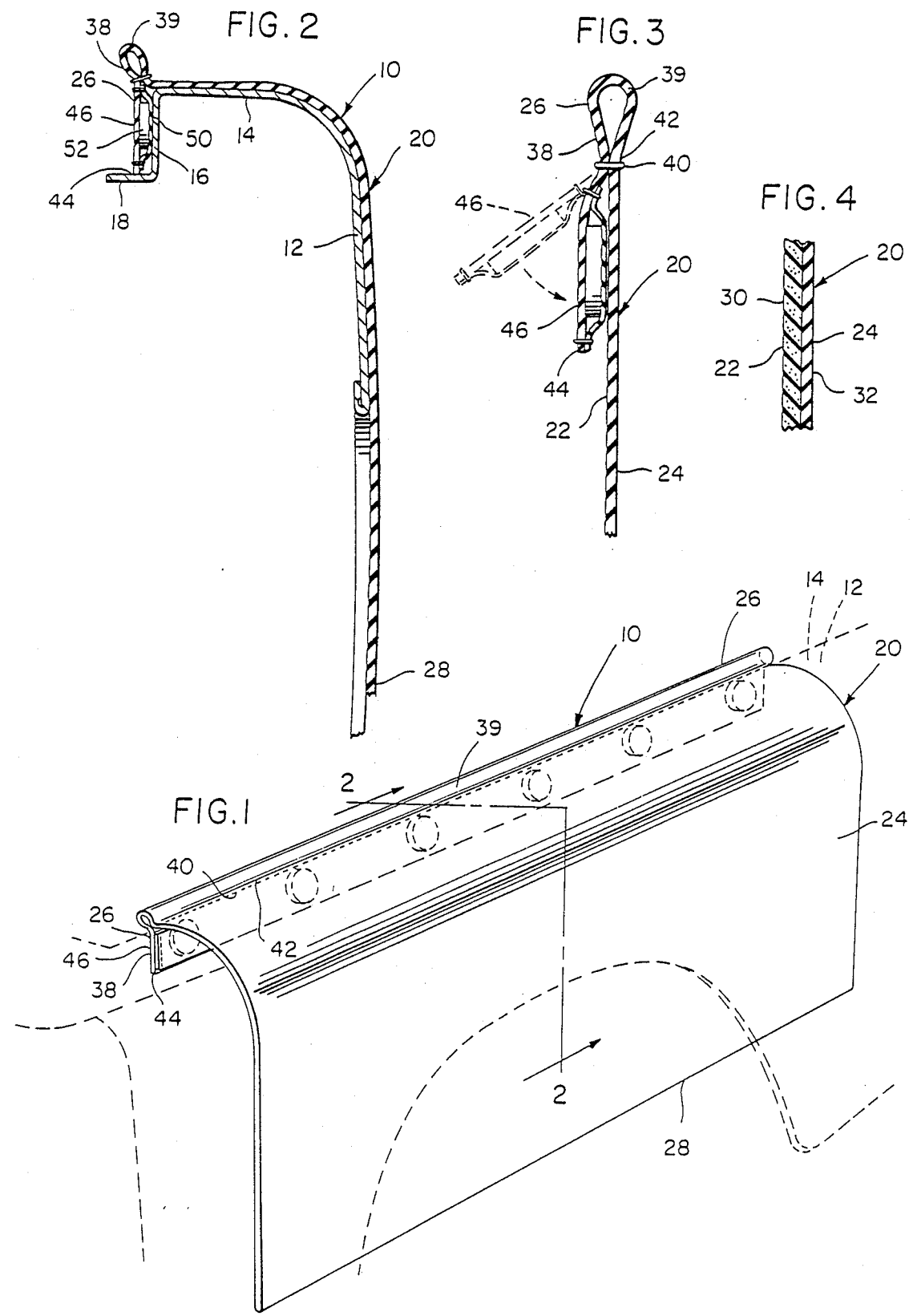

MAGNETIC FENDER COVER

BACKGROUND OF THE INVENTION

1. Field of the Invention

This invention relates to a resiliently pliant panel assembly defining inner and outer side surfaces. The inner surface is defined by an inner resilient panel, and the panel assembly includes first and second opposite marginal portions. The first marginal portion includes a free marginal band portion folded back over the inner side surface of the panel assembly and secured to the underlying portion of the first marginal portion along a narrow path spaced appreciably from the free edge of the free marginal band portion. That portion of the free marginal band portion disposed between the aforementioned path and the free edge of the free marginal band portion is hook engageable over the depending mounting flange portion of the upper inside portion of a vehicle front fender for establishing a mechanical connection with the associated fender. Also, the free marginal band portion includes permanent magnets spaced longitudinally therealong for further magnetic connection with the associated fender.

2. Description of Related Art

Various different forms of fender pads and covers heretofore have been provided, such as those disclosed in U.S. Pat. Nos. 2,113,294; 2,119,072; 2,460,394; 2,880,015; 2,979,190; and 3,298,712. However, these previously known forms of fender pads and covers do not include the overall combination of structural features of the instant invention.

SUMMARY OF THE INVENTION

The fender cover of the instant invention includes first and second opposite marginal portions adapted to be uppermost and lowermost, respectively, when the fender cover is draped over the upper portion of a vehicle fender. The first marginal portion includes a free marginal band portion folded under the lower or inner surface of the cover and secured thereto along a narrow path generally paralleling and spaced appreciably from the free edge of the free marginal band portion. The unsecured edge zone of the free marginal band portion may be angularly displaced about the aforementioned narrow path and hook engaged over the upper marginal edge of the associated fender and extend downwardly along the depending mounting flange portion of the fender, the cover comprising a resilient panel and the resiliency of the panel enabling the angularly displaced portion of the free marginal band portion and the opposing portion of the panel to clampingly engage the upper marginal portion of the associated fender and the depending mounting flange thereof therebetween. In addition, spaced permanent magnets are mounted along the free marginal band portion and also establish a magnet connection between the fender cover and the depending mounting flange thereof.

The main object of this invention is to provide an improved fender cover for a vehicle such as a passenger vehicle.

Another object of this invention is to provide a fender cover constructed in a manner to afford, in addition to the usual frictional connection with the associated fender, a clamping-type mechanical connection, as well as a magnetic connection, between the cover and the associated fender.

Yet another object of this invention is to provide a fender cover which will afford maximum protection to an underlying associated fender from direct contact therewith by hand tools.

Still another object of this invention is to provide a fender cover which will also provide maximum protection against fluids falling upon the cover damaging the underlying fender and its paint covering.

A final object of this invention to be specifically enumerated herein is to provide an improved fender cover in accordance with the preceding objects and which will conform to conventional forms of manufacture, be of simple construction, and easy to use so as to provide a device that will be economically feasible, long-lasting, and relatively trouble-free in operation.

These, together with other objects and advantages which will become subsequently apparent, reside in the details of construction and operation, as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a fender cover constructed in accordance with the present invention and operatively associated with a typical vehicle fender, the fender being illustrated in phantom lines;

FIG. 2 is an enlarged fragmentary vertical sectional view taken substantially upon the plane indicated by the section line 2—2 of FIG. 1 and with the fender illustrated in solid lines;

FIG. 3 is a fragmentary enlarged vertical sectional view of the upper marginal portion of the fender cover illustrating the reversely turned free marginal band portion thereof and the permanent magnets supported therefrom, as well as the manner in which the unsecured portion of the reversely turned band portion may be angularly displaced relative to the remainder of the fender cover; and FIG. 4 is an enlarged fragmentary vertical sectional view illustrating the two-ply panels of the fender cover.

DESCRIPTION OF THE PREFERRED EMBODIMENT

Referring now more specifically to the drawings, the numeral 10 generally designates a fender cover constructed in accordance with the present invention.

As may best be seen from FIG. 2 of the drawings, a conventional vehicle front fender 12 usually includes an inner side upper marginal portion 14, which terminates inwardly in a depending mounting flange portion 16. The mounting flange portion 16, in some instances, terminates downwardly in a horizontally and inwardly directed flange portion 18, although the flange portion 18 is omitted in some instances.

When working upon components within the engine compartment of a conventional passenger vehicle disposed between the front fenders 12 thereof, mechanics often must lean across one of the fenders 12 and move tools and/or parts over the fender 12 into the engine compartment or outwardly therefrom. Occasionally, an unprotected fender will be scratched or otherwise damaged by a portion of the mechanic's clothing coming in contact therewith, by a tool or part dropping on the fender, or by the liquids spilling upon the fender. Accordingly, fender covers, such as the fender cover 10, are provided to protect the fender 12.

The fender cover 10 incorporates a reasonably stiff and resiliently pliant panel assembly, referred to in general by the reference numeral 20, having inner and outer side surfaces 22 and 24, see FIGS. 1 and 4. In addition, the panel assembly 20 includes first and second opposite marginal portions 26 and 28 comprising the upper and lower margins of the panel assembly 20, and the panel assembly 20 is composed of a thick, closed cell foam panel 30 and an outer fluid-impervious coating. The panel 30 defines a non-slip inner side surface 22, and the coating 32 defines the outer side surface 24. The foam panel 30 may be constructed of any suitable elastomer material and, because of such elastomer material, the panel assembly 20 is rendered reasonably stiff and resiliently pliant.

The first marginal portion 26 includes a free marginal band portion 38, see FIG. 3, which is reversely turned or folded, along a fold zone 39, over the inner side surface 22 and secured to the remainder of the panel assembly 20 by stitching 40 or other means along a narrow path 42 extending along the free marginal band portion 38 and spaced generally one and one-half inches from the free edge 44 thereof. That portion of the band portion 38 disposed between the stitching 40 and the free edge 44 tends to closely overlie and parallel the opposing portion of the panel assembly 20. However, that portion 46 of the band portion 38 between the stitching 40 and the free edge 44 may be angularly displaced along the narrow path 42 relative to the remainder of the panel assembly 20 in the manner illustrated in phantom lines in FIG. 3. Such angular displacement may be as much as 120° relative to the remainder of the panel assembly 20, but in most instances is limited to an angular position disposed 90° or less relative to the remainder of the panel assembly 20.

With attention invited to FIG. 2 of the drawings, it may be seen that when the portion 46 is angularly displaced to a position generally 90° relative to the remainder of the panel assembly 20, the portion 46, defining a gripping flange, and the opposing portion of the panel assembly 20 may clingingly engage, therebetween, the corner portion of the front fender 12 defined by the upper marginal portion 14 and the mounting flange portion 16 thereof when the fender cover 10 is engaged over the fender 12 in the manner illustrated in FIG. 2. The resiliency of the foam panel 30 tends to swing the portion or gripping flange 46 back to a position generally paralleling the opposing portion of the panel assembly 20, and thus the fender cover 10 effects a mechanical connection between the first marginal portion 26 and the upper marginal portion of the fender 10.

In addition, the portion 46 has a thin, flexible panel 50 secured over the inner surface thereof, and a plurality of permanent magnets 52 are disposed between the panel 50 and the portion 46. These permanent magnets serve to effect a magnetic connection between the portion 46 and the mounting flange portion 16 of the fender 12. Hence, the fender cover 10 enjoys a frictional connection with the fender 12 in view of the inner surface 22 defined by the foam panel 30, a mechanical connection due to the clamping action of the portion 46 and the underlying panel assembly portion on the portions 14 and 16 of the fender 12 and a magnetic connection between the portion 46 and the mounting flange portion 16.

Inasmuch as the foam panel 30 is closed cellular in nature, the fender 12 is protected against being dented by tools being dropped on any portion thereof covered by the cover 10. In addition, the fender cover 10 protects the fender cover 12 against scratching by any portion of the clothing of a mechanic, and the outer fluid-impervious coating 32 of the fender cover 12 prevents any liquid from spilling on the outer surface of the fender cover 10 from reaching the fender 12.

The foregoing is considered as illustrative only of the principles of the invention. Further, since numerous modifications and changes will readily to those skilled in the art, it is not desired to limit the invention to the exact construction and operation shown and described; and, accordingly, all suitable modifications and equivalents may be resorted to falling within the scope of the invention.

I claim:

1. A fender cover for covering at least an upper marginal portion of a fender and operable to exert at least a predetermined mechanical connection with said fender whose upper marginal portion includes a corner edge defining an integral depending mounting flange, said fender including a reasonably stiff and resilient pliant panel assembly having inner and outer side surfaces extending between opposite first and second marginal portions of said panel assembly, said first marginal portion being folded, along a fold zone, back over and closely opposing an underlying portion of said inner side surface, said first marginal portion including a free edge and being secured to the underlying portion of said panel assembly along a narrow path extending along said first marginal portion spaced closely adjacent said fold zone and an appreciably greater distance from said free edge, an outer portion of said first marginal disposed between said narrow path and said free edge being of sufficient width to form a surface gripping flange and being angularly displaceable, closely adjacent said path, up to 120° relative to the portion of said free marginal portion secured to said underlying portion of said panel assembly away from said underlying portion of said panel assembly, whereby said fender cover may be draped over said upper marginal portion of said fender with said outer portion of said first marginal portion defining said gripping flange overlying and extending along said mounting flange and the resiliency of said outer portion closely adjacent said path biasing said angularly displaced outer portion of said first marginal portion defining said gripping flange back toward a static position thereof generally paralleling the opposing portion of said panel assembly disposed closely adjacent and on the opposite side of said path for mechanical clamped engagement by said gripping flange and said opposing portion of said panel assembly with the portions of said fender extending along and disposed on opposite sides of said corner edge.

2. The fender cover of claim 1, wherein said inner side surface comprises a non-slip surface.

3. The fender cover of claim 1, wherein said panel assembly is constructed of a closed cellular elastomeric material panel.

4. The fender cover of claim 3, wherein said outer side surfaces defined by a non-porous coating disposed over the corresponding side of said panel.

5. The fender cover of claim 10, wherein the width of said free marginal band portion, between said narrow path and said free edge of said free marginal band portion, is generally 1½ inches.

6. The fender cover of claim 1, wherein the inner surface of said panel assembly, in the area thereof between said narrow path and said free edge, includes a thin, flexible panel secured thereover and a plurality of permanent magnets disposed between said thin flexible panel and said area of said inner surface and spaced apart along said free marginal band.

7. The fender cover of claim 6, wherein said inner side surface comprises a non-slip surface.

8. The fender cover of claim 7, wherein said outer side surfaces defined by a non-porous coating disposed over the corresponding side of said panel, said outer side surface being defined by a non-porous sheet disposed over the corresponding side of said panel.

9. The fender cover of claim 8, wherein the width of said free marginal band portion, between said narrow path and said free edge of said free marginal band portion is $1\frac{1}{2}$ inches.

* * * * *